(12) United States Patent
Kato et al.

(10) Patent No.: US 11,738,498 B2
(45) Date of Patent: Aug. 29, 2023

(54) PRODUCTION DEVICE FOR FUEL TANK

(71) Applicant: YACHIYO INDUSTRY CO., LTD., Saitama (JP)

(72) Inventors: Yuichi Kato, Saitama (JP); Tsukuba Sato, Saitama (JP); Yinghao Ding, Saitama (JP); Masatoshi Okano, Saitama (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/633,395

(22) PCT Filed: Jun. 17, 2020

(86) PCT No.: PCT/JP2020/023716
§ 371 (c)(1),
(2) Date: Feb. 7, 2022

(87) PCT Pub. No.: WO2021/029131
PCT Pub. Date: Feb. 18, 2021

(65) Prior Publication Data
US 2022/0288837 A1  Sep. 15, 2022

(30) Foreign Application Priority Data

Aug. 9, 2019 (JP) ................. 2019-147289

(51) Int. Cl.
*B29C 49/42* (2006.01)
*B29C 49/20* (2006.01)
*B29L 31/00* (2006.01)

(52) U.S. Cl.
CPC ........ *B29C 49/42065* (2022.05); *B29C 49/20* (2013.01); *B29C 49/42113* (2022.05);
(Continued)

(58) Field of Classification Search
CPC ................. B29C 49/42065; B29C 2049/2073
See application file for complete search history.

(56) References Cited

U.S. PATENT DOCUMENTS

| 7,665,982 | B2 * | 2/2010 | Lucier | ................... B29C 51/267 425/515 |
| 8,105,528 | B2 * | 1/2012 | Aoki | ................... B29C 49/4242 264/516 |
| 2015/0306797 | A1 | 10/2015 | Dai et al. | |

FOREIGN PATENT DOCUMENTS

| JP | 2016-28860 A | 3/2016 |
| WO | 2016/076101 A1 | 5/2016 |
| WO | 2021/029131 A1 | 2/2021 |

OTHER PUBLICATIONS

International Search Report and Written Opinion of the International Search Report for PCT/JP2020/023716 dated Aug. 11, 2020.
(Continued)

*Primary Examiner* — Russell E Sparks
(74) *Attorney, Agent, or Firm* — Kenealy Vaidya LLP

(57) ABSTRACT

A production device for a fuel tank, having two or more built-in components attached to an inside of a fuel tank body when the fuel tank body is formed, includes: jigs configured to have the built-in components placed thereon; and a feed robot, as a feed device, configured to feed the built-in components, along with the jigs having the built-in components placed thereon, to a position below molding dies. The feed device may feed the jig, having the built-in components placed thereon, to the position via a subsurface feed path leading to the position.

4 Claims, 15 Drawing Sheets

(52) U.S. Cl.
CPC ................. *B29C 2049/2008* (2013.01); *B29C 2049/2073* (2013.01); *B29L 2031/7172* (2013.01)

(56) References Cited

OTHER PUBLICATIONS

International Preliminary Report on Patentability for PCT/JP2020/023716 dated Dec. 16, 2020 and partial English translation of relevant portions showing indication of patentability for PPH Request.

\* cited by examiner

PRODUCTION DEVICE FOR FUEL TANK

CROSS-REFERENCE TO RELATED APPLICATIONS

This application is a U.S. National Stage Application under 35 U.S.C. § 371 of International Patent Application No. PCT/JP2020/023716 filed Jun. 17, 2020, which claims the benefit of priority to Japanese Patent Application No. 2019-147289 filed Aug. 9, 2019.

The present invention relates to a production device for a fuel tank.

BACKGROUND ART

Patent Document 1 discloses a fuel tank manufacturing apparatus using a lifting device to introduce a built-in component inside a parison from below a molding die, when a fuel tank body is molded, to attach the built-in component to the inside of the fuel tank body. The lifting device is provided, at a tip thereof, with a jig having the built-in component attached thereto and detached therefrom. In molding a fuel tank, the built-in component is attached by a feed robot to the jig located at a waiting position below the molding die when the die has been opened, and then the jig is lifted to feed the built-in component to the inside of the parison.

PRIOR ART DOCUMENT

Patent Document

Patent Document 1: International Patent Application Publication No. 2016/076101

SUMMARY OF THE INVENTION

Problems to be Solved

However, the technique of Patent Document 1 requires such a placing action more than once while the die is open, in a case of having two or more built-in components to be placed on the jig, to cause the feed robot to repeat the action several times. This raises a problem that a molding cycle becomes longer for a fuel tank having two or more built-in components built therein.

The present invention has been devised from such a viewpoint, and is intended to shorten a molding cycle of a fuel tank having two or more built-in components built therein.

Solution to Problems

In order to solve the above-identified problems, the present invention provides a production device for a fuel tank having two or more built-in components attached to an inside of a fuel tank body when the fuel tank body is molded, the production device including: a jig configured to have the built-in components placed thereon; and a feed device configured to feed the built-in components along with the jig having the built-in components placed thereon to a position below molding dies, wherein the feed device replaces the empty jig, from which the built-in components have been removed for molding, with another jig having the built-in components placed thereon.

According to the present invention, the feed device feeds the two or more built-in components along with the jig. This allows the two or more built-in components to be inserted between the molding dies, in a single feed. A cycle of molding the fuel tank, having the two or more built-in components built therein, is therefore shortened.

In addition, the feed device preferably feeds the jig, having the built-in components placed thereon, to the position below the molding dies through a subsurface feed path leading to a location below the molding dies.

This allows the jig to be moved through the subsurface feed path even when the molding dies are closed, to improve efficiency of feeding the jig. As a result, the cycle of molding the fuel tank, having the two or more built-in components built therein, is further shortened.

Advantageous Effects of the Invention

According to the present invention, a cycle of molding a fuel tank, having two or more built-in components built therein, is shortened.

DETAILED DESCRIPTION OF EMBODIMENTS

First Embodiment

<Overall Configuration>

Figure 1:
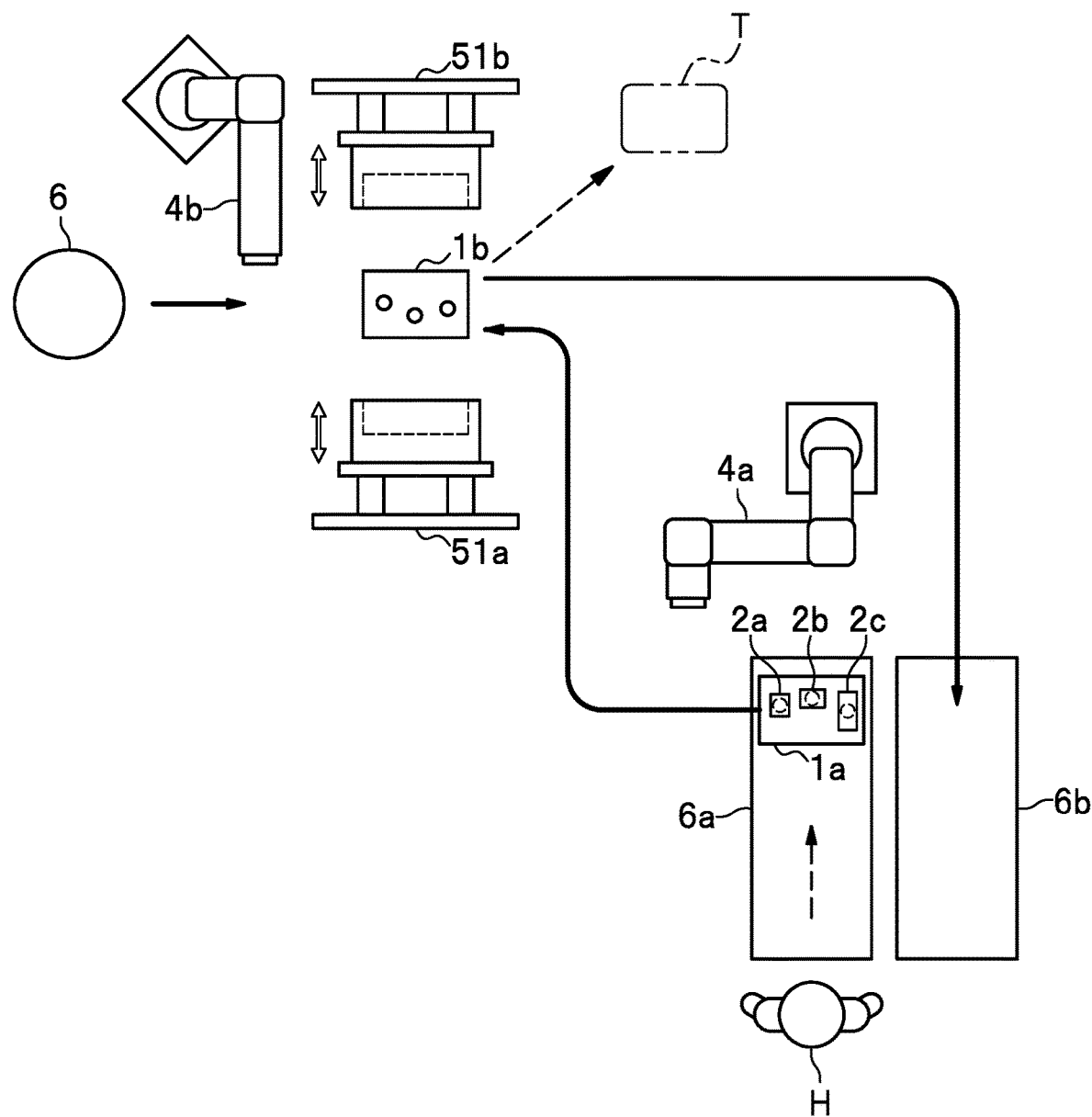
FIG. 1 is a schematic top view of a production device for a fuel tank according to a first embodiment.
Figure 2:
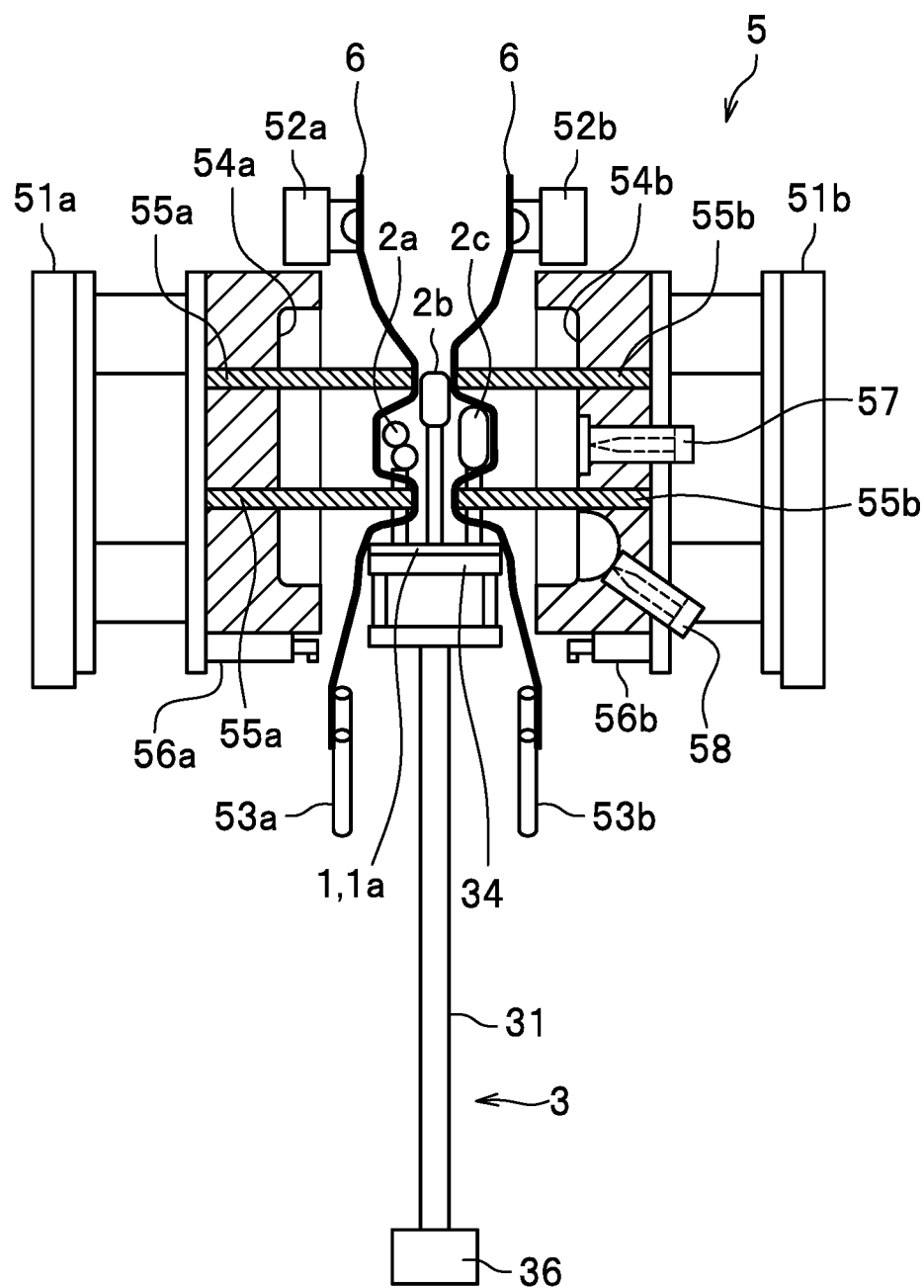
FIG. 2 illustrates fitting built-in components by the production device according to the first embodiment.

A production device for a fuel tank according to a first embodiment is a device to use a parison 6 to produce a fuel tank T by blow molding, as shown in FIG. 1. The production device for a fuel tank according to the first embodiment mainly includes jigs 1a and 1b, feed robots 4a and 4b, a pair of molding dies 51a and 51b, and feed conveyors 6a and 6b. In addition, the production device for a fuel tank of the first embodiment includes a lifting device 3, as shown in FIG. 2.

The jigs 1a and 1b are members to have three built-in components 2a to 2c placed thereon and to detachably hold the built-in components 2a to 2c. The number of built-in components to be placed on each of the jigs 1a and 1b may be two or less, or four or more. The built-in components 2a to 2c are components to be built in the fuel tank T as a finished product, such as brackets, wave-absorption plates, and valves, but are not limited thereto.

The jigs 1a and 1b each have the same shape and play the same role as each other. The two jigs 1a and 1b are shown in FIG. 1, but the number of jigs used in the production device for a fuel tank according to the first embodiment is not limited to two and may be one or may be three or more. For the purpose of illustration, when the jigs 1a and 1b are not distinguished, they are simply referred to as a jig 1. A provisional fixing means (not shown) may be used to easily lock/unlock the built-in components 2a to 2c to/from the jig 1a, to prevent the built-in components 2a to 2c from falling off the jig 1a during feeding.

The feed robots 4a and 4b are each a feed device including an arm portion and a hand portion at a tip of the arm portion, for example, and feeding an object held by the hand portion to a predetermined position. The feed robot 4a is a device to feed the jigs 1a and 1b. The feed robot 4b is a device to feed the parison 6.

The molding dies 51a and 51b are molding dies to be used for blow molding. The parison 6 is fed by the feed robot 4b to a position between the opened molding dies 51a and 51b. The parison 6 is made of a thermoplastic resin containing a barrier layer, for example. The parison 6 has a multi-layer structure including an EVOH layer (ethylene-vinyl alcohol copolymer layer), as a barrier layer for blocking fuel from permeating therethrough, in the center of the layers, a PE layer (polyethylene layer), and an adhesive layer, for example. The feed conveyors 6a and 6b are devices to feed the jigs 1a and 1b from the vicinity of a worker H to a range of motion of the feed robot 4a, and to feed the jigs 1a and 1b from the range of motion of the feed robot 4a to the vicinity of the worker H, respectively.

The feed robot 4a holds the jig 1a arranged on the feed conveyor 6a, and feeds the built-in components 2a to 2c, along with the jig 1a, to a pedestal 34 (see FIG. 2) located at a waiting position below the molding dies 51a and 51b. The built-in components 2a to 2c are unlocked from the jig 1a during blow molding and welded to the parison (fuel tank body) 6.

The jig 1b in FIG. 1 is located at a waiting position below the molding dies 51a and 51b after the built-in components 2a to 2c have been fed into the parison 6. That is, the jig 1b is empty without holding the built-in components 2a to 2c. The feed robot 4a holds the jig 1b and feeds back the jig 1b from below the molding dies 51a and 51b to the feed conveyor 6b. The jig 1b is conveyed to the vicinity of the worker H by the feed conveyor 6b. The worker H can place the new built-in components 2a to 2c on the jig 1b.

<Details of Blow Molding>

First, a description is given in detail of blow molding by the production device for a fuel tank according to the first embodiment, with reference to FIG. 2. As shown in FIG. 2, the production device for a fuel tank according to the first embodiment includes a pair of chuck portions 52a and 52b and a pair of expansion pins 53a and 53b, in addition to the lifting device 3 and the pair of molding dies 51a and 51b.

The molding dies 51a and 51b are configured to be movable along an inward and outward direction (die opening/closing direction). The molding dies 51a and 51b are formed, in inner surfaces thereof, with molding surfaces 54a and 54b for molding the fuel tank main body, so as to be recessed outward. The molding dies 51a and 51b have joining cylinders 55a and 55b, freely expanded and contracted along the inward and outward direction (die opening/closing direction), provided at substantially the center thereof. The joining cylinders 55a and 55b are provided in pairs of right and left pieces, and the first embodiment has two pairs provided so as to be away from each other in the vertical direction. The joining cylinders 55a and 55b are extended in pairs to press the parison 6 from outside, to have a function of joining (welding) the built-in components 2a to 2c to the inside the parison 6.

The molding dies 51a and 51b are provided, at lower ends thereof, with a pair of pinch portions 56a and 56b freely expanded and contracted along the inward and outward direction (die opening/closing direction). The pinch portions 56a and 56b are both extended to press a lower end portion of the parison 6, to have a function of closing the parison 6.

The molding die 51b is unilaterally provided with a first blow pin 57 for blowing air to the inside of the parison 6, and a second blow pin 58 for discharging air from the inside of the parison 6 to the outside. The first blow pin 57 is provided in the central portion of the molding die 51b so as to be moved forward and backward. The second blow pin 58 is provided in a lower corner of the molding die 51b so as to be moved forward and backward.

The chuck portions 52a and 52b are movably provided above the molding dies 51a and 51b along the inward and outward direction (die opening/closing direction). The chuck portions 52a and 52b hold the upper end portion of the parison 6 in a cylindrical or sheet shape and arrange the parison 6 between the molding dies 51a and 51b. In addition, the chuck portions 52a and 52b approach each other to press and close the upper end portion of the parison 6. The chuck portions 52a and 52b are components of the feed robot 4b.

The expansion pins 53a and 53b are movably arranged below the molding dies 51a and 51b along the inward and outward direction (die opening/closing direction). The expansion pins 53a and 53b move away from each other to expand a lower end portion of the parison 6.

The lifting device 3 is a device to detachably support and lift the jig 1 with or without the built-in components 2a to 2c placed on the jig 1. The lifting device 3 is arranged below (directly below) the molding dies 51a and 51b. The lifting device 3 includes a support rod 31, the pedestal 34, and a slide mechanism 36.

The support rod 31 is a rod-shaped member extending in the vertical direction. The support rod 31 is supported by the slide mechanism 36 so as to be vertically slidable.

The pedestal 34 is a member on which the jig 1 is placed. The pedestal 34 is fixed to an upper end of the support rod 31. The pedestal 34 and the jig 1 may be each provided with a fitting portion or the like, as a fall prevention mechanism (not shown) for preventing the jig 1 from falling off the pedestal 34.

<Method of Producing Fuel Tank>

Next, a description is given of a method of producing a fuel tank by a production device for a fuel tank according to the first embodiment, with reference to FIGS. 1 to 5.

Figure 3:
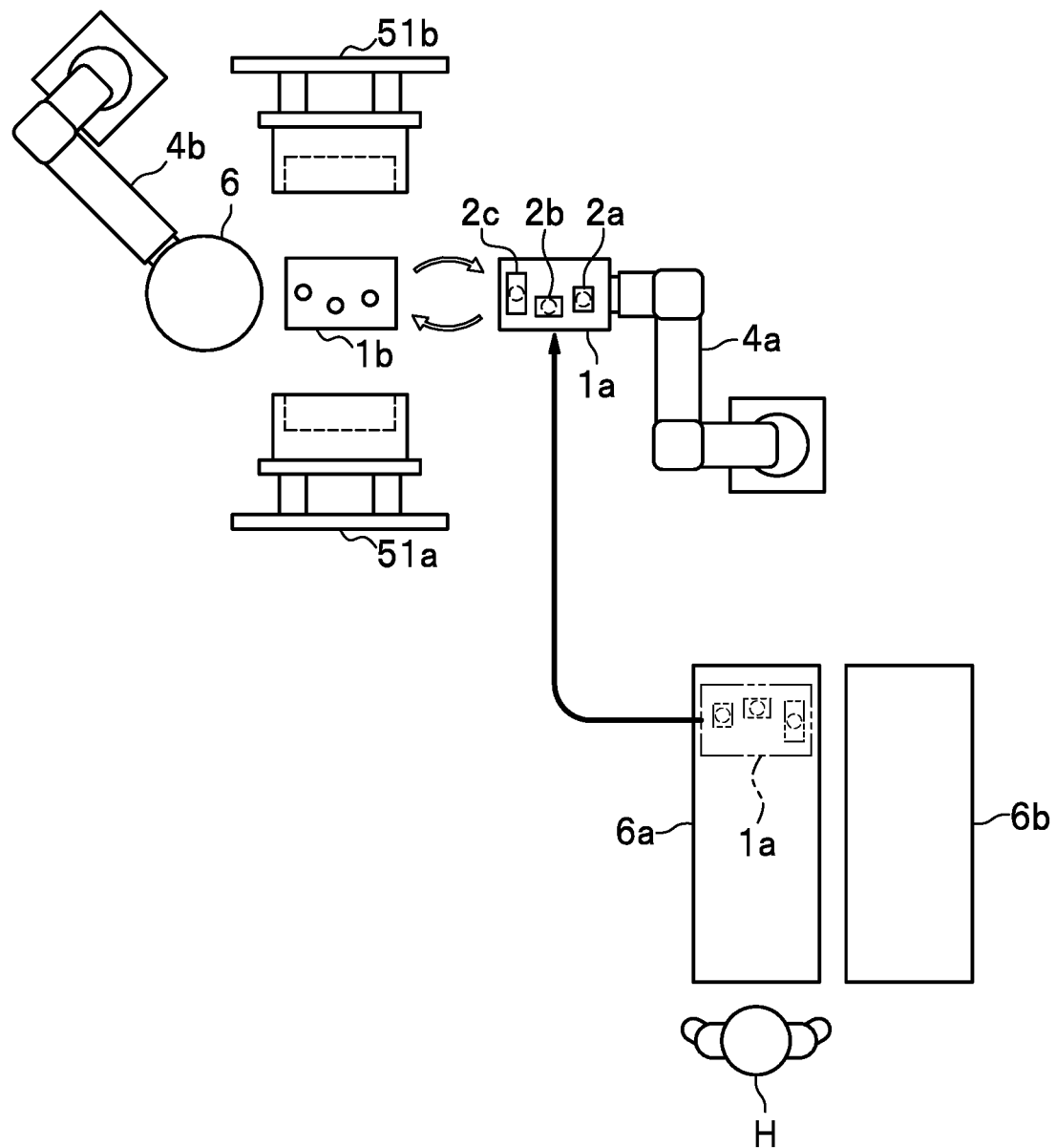
FIG. 3 illustrates a method of producing a fuel tank by the production device according to the first embodiment (1 of 3)

First, the fuel tank T, for which blow molding has already been completed, is taken out after the die is opened, as shown in FIG. 1. The jig 1b, from which the built-in components 2a to 2c have been removed, is at a waiting position below the molding dies 51a and 51b, while being attached to the pedestal 34 of the lifting device 3. As shown in FIG. 3, the feed robot 4a holds the jig 1a, having the built-in components 2a to 2c placed thereon, from the feed conveyor 6a, and replaces the empty jig 1b placed on the pedestal 34 with the jig 1a having the built-in component 2a to 2c placed thereon.

Replacing the jig 1b with the jig 1a uses a well-known technique. For example, it is assumed that the feed robot 4a includes two holding means of a first hand and a second hand, and the first hand holds the jig 1a having the built-in components 2a to 2c placed thereon. In this situation, the second hand holding nothing holds the jig 1b supported by the lifting device 3 and moves it to a predetermined position, and then the first hand sets the jig 1a, having the built-in components 2a to 2c placed thereon, on the pedestal 34 of the lifting device 3 to replace the jigs 1b with the jig 1a.

Figure 4:
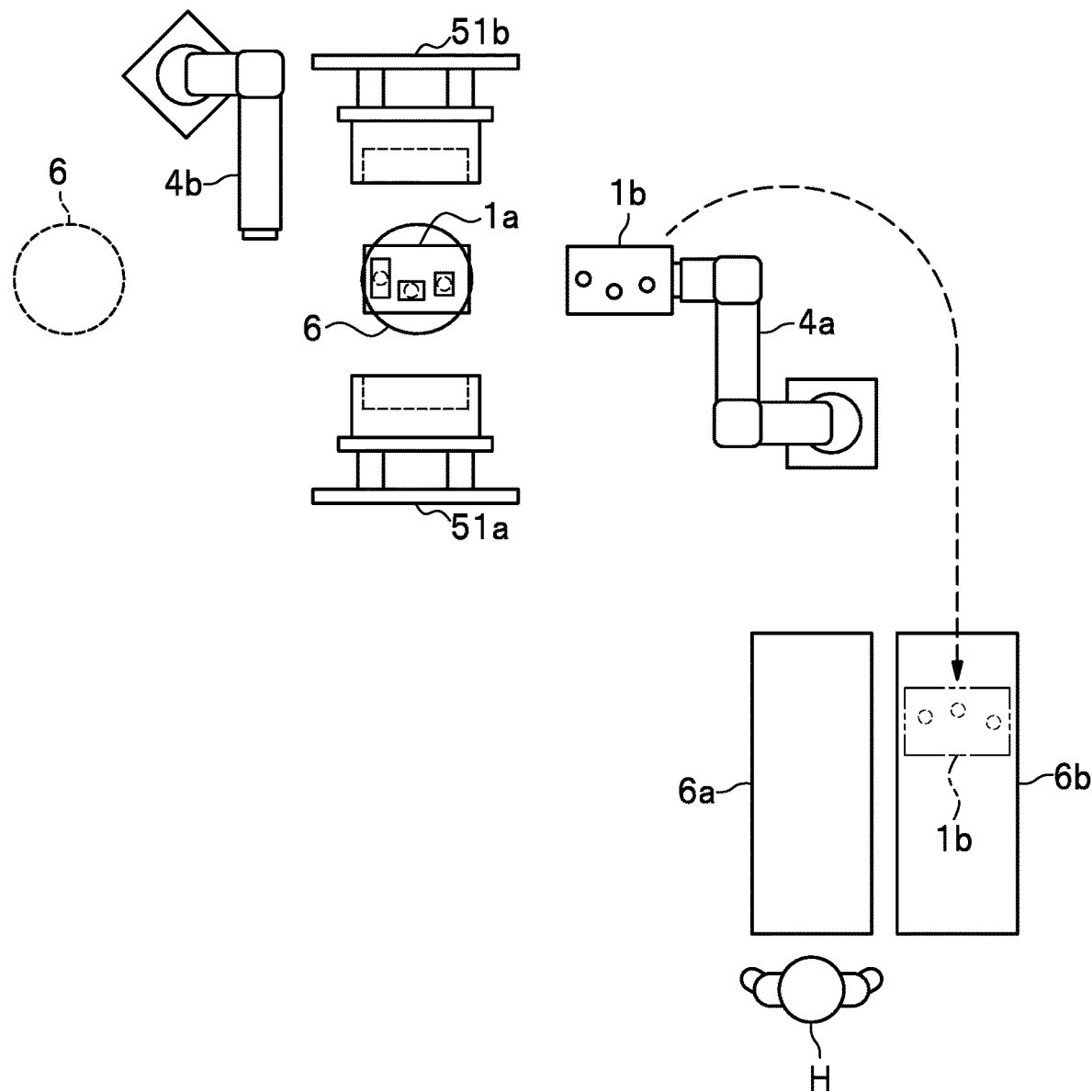
FIG. 4 illustrates the method of producing a fuel tank by the production device according to the first embodiment (2 of 3)

Next, the feed robot 4a feeds back the empty jig 1b, having no built-in components 2a to 2c placed thereon, to the feed conveyor 6b, as shown in FIG. 4.

Additionally, in parallel with the feed robot 4a feeding the jig 1b, the feed robot 4b feeds the parison 6 to a position between the molding dies 51a and 51b. In this situation, the jig 1a having the built-in components 2a to 2c placed thereon, supported by the lifting device 3, stands by at a position below the molding dies 51a and 51b. In addition, the parison 6 to be fed next is prepared behind the molding dies 51a and 51b.

Figure 5:
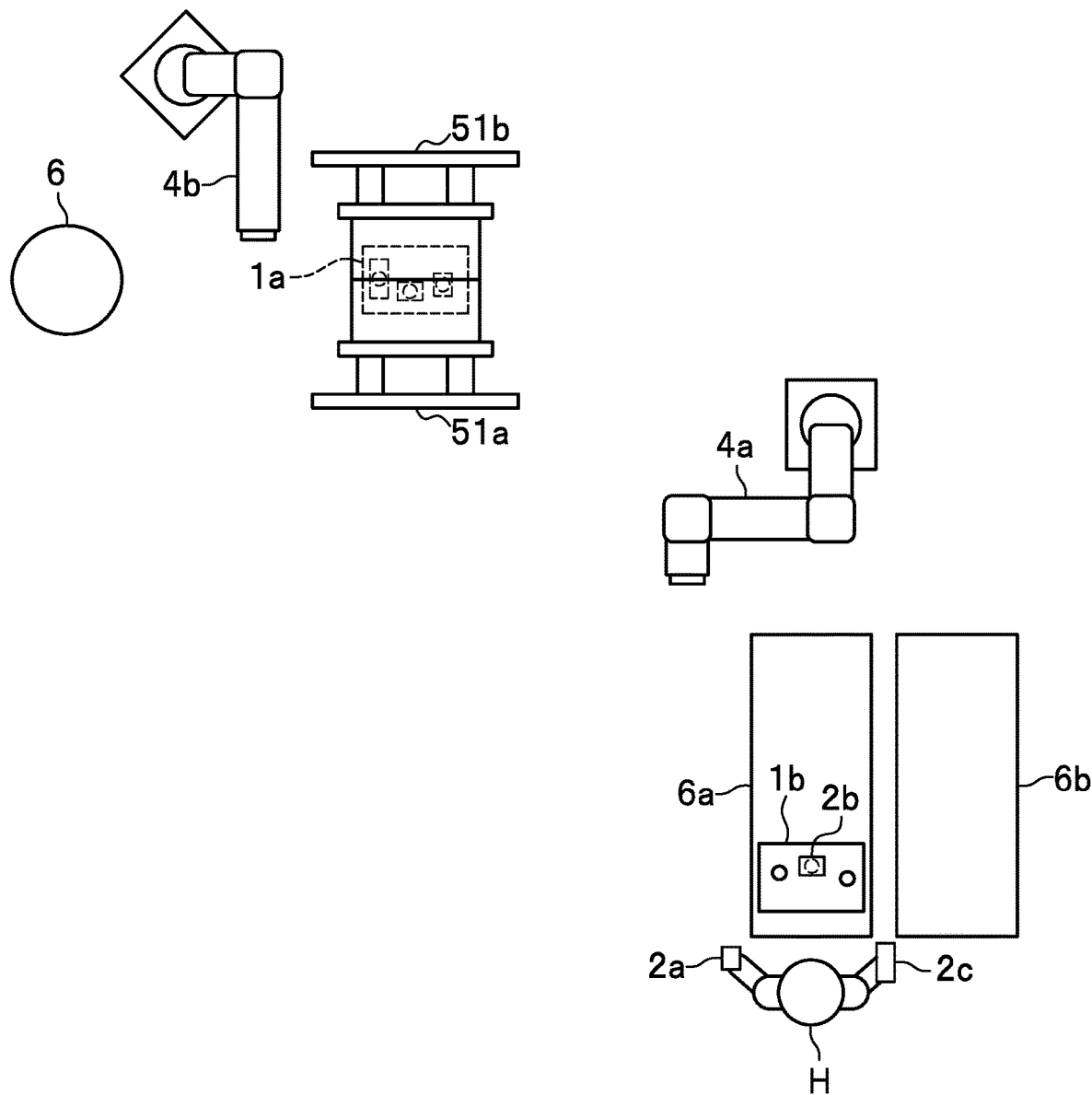
FIG. 5 illustrates the method of producing a fuel tank by the production device according to the first embodiment (3 of 3)

Next, the jig 1a having the built-in components 2a to 2c placed thereon is lifted by the lifting device 3, and is inserted between the molding dies 51a and 51b and also inside the parison 6 for blow molding, as shown in FIG. 5. In this situation, the worker H places the new built-in components 2a to 2c on the empty jig 1b, and makes the jig 1b stand by on the feed conveyor 6b and also within a range of motion of the feed robot 4a.

<Procedure of Blow Molding>

The blow molding begins with moving the expansion pins 53a and 53b, located inside the parison 6, away from each other to expand the lower end portion of the parison 6, as shown in FIG. 2.

Next, the lifting device 3 lifts the jig 1a, having the built-in components 2a to 2c placed thereon, to a predetermined position between the molding dies 51a and 51b. The support rod 31 is slid upward to position the jig 1, having the built-in components 2a to 2c placed thereon, between the molding dies 51a and 51b and also inside the parison 6.

Next, the built-in components 2a to 2c are welded to the parison 6. Specifically, the joining cylinders 55a and 55b are extended inward (die closing direction) to clamp and press the built-in components 2a to 2c from the outside of the parison 6. At this time, the pressing between the tips of the joining cylinders 55a and 55b causes pressed portions of the parison 6 and the built-in components 2a to 2c to be melted. As the locking (provisional fixing) between the jig 1a and the built-in components 2a to 2c is released at this time, the support rod 31 is slid downward to locate the empty jig 1b at a waiting position below the molding dies 51a and 51b.

Additionally, the blow molding goes through steps of chucking the parison 6 with the chuck portions 52a and 52b blocked and the pinch portions 56a and 56b closed, pre-blowing, blowing air after the die is closed, and cooling the inside of the die and discharging the air, and then the fuel tank T having the built-in components 2a to 2c built therein is taken out. The above-described steps are repeated to continuously produce the fuel tanks T.

According to the first embodiment, the feed robot (feed device) 4a feeds the built-in components 2a to 2c along with the jig 1. This allows the built-in components 2a to 2c of two or more components to be inserted between the molding dies 51a and 51b and also inside the parison 6, in a single feed. Accordingly, the cycle of molding the fuel tank T having the two or more built-in components 2a to 2c built therein is shortened.

Note that the present invention is not limited to the above-described steps. For example, the parison 6 may be dropped between the molding dies 51a and 51b from above, instead of being fed by the feed robot 4b.

Second Embodiment

A description is given of a second embodiment, basically omitting redundant descriptions, as compared to the first embodiment, and focusing on differences from the first embodiment.

<Overall Configuration>

Figure 6:
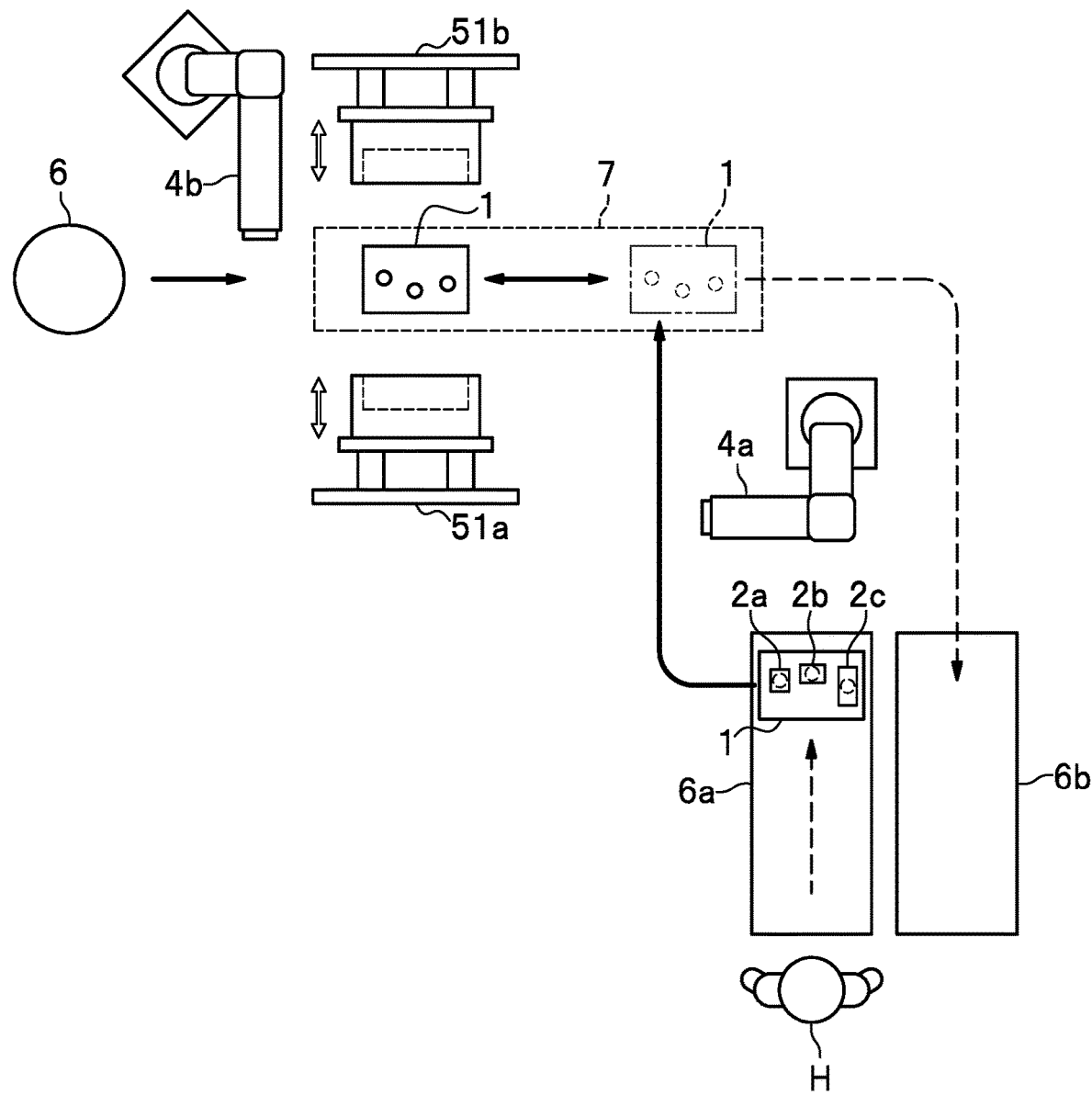
FIG. 6 is a schematic top view of a production device for a fuel tank according to a second embodiment.

As shown in FIG. 6, a production device for a fuel tank according to the second embodiment is different from the production device for a fuel tank according to the first embodiment on the point that the former further includes a subsurface conveyor 7. The subsurface conveyor 7 is a feed device as a subsurface feed path leading to a location below the molding dies 51a and 51b. That is, the feed robot 4a and the subsurface conveyor 7 are included in the "feed device" in one or more claims.

The subsurface conveyor 7 conveys the jig 1 having the built-in components 2a to 2c placed thereon to the location below the molding dies 51a and 51b via the subsurface feed path. FIG. 6 shows the subsurface conveyor 7 feeding the empty jig 1. A subsurface space is defined below the molding dies 51a and 51b arranged on a reference plane GL (see FIG. 7), to have the subsurface conveyor 7 arranged in the subsurface space. The reference plane GL is the ground or a plane on which the molding dies 51a and 51b are arranged, for example.

Figure 7:
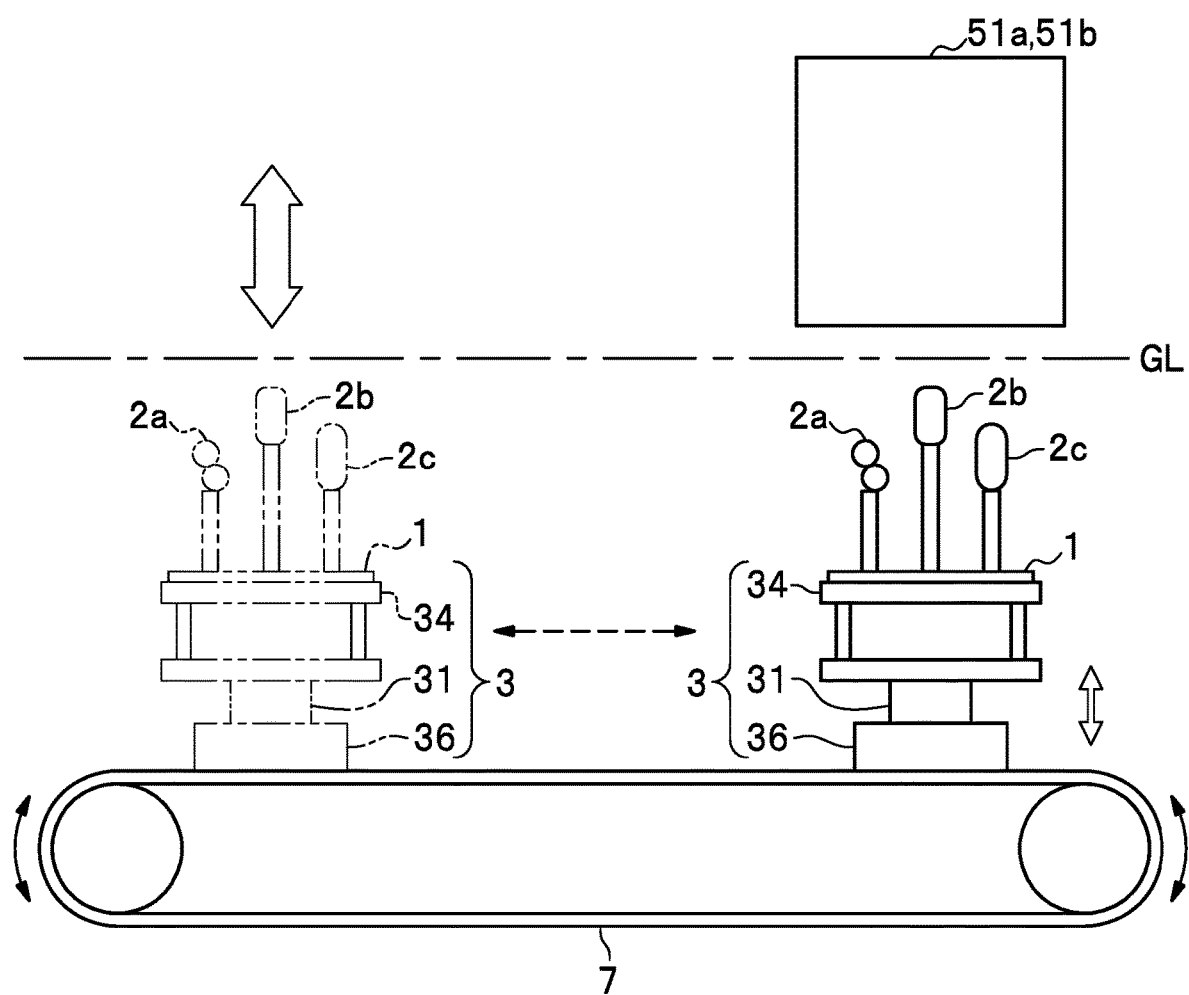
FIG. 7 is a schematic lateral view of the production device for a fuel tank according to the second embodiment.

As shown in FIG. 7, the subsurface conveyor 7 is arranged below the reference plane GL, and one end of the subsurface conveyor 7 is located below the molding dies 51a and 51b. Note that only a part of the subsurface conveyor 7 may be located below (directly below) the molding dies 51a and 51b.

The lifting device 3 is provided on the subsurface conveyor 7. The lifting device 3 includes the support rod 31, the pedestal 34, and the slide mechanism 36, which have already been described. The jig 1 is placed on the pedestal 34 of the lifting device 3. FIG. 7 shows that the jig 1 having the built-in components 2a to 2c placed thereon is arranged on the lifting device 3.

The subsurface conveyor 7 can convey the jig 1 along with the lifting device 3 from one end (directly below the molding dies 51a and 51b) to the other end, and vice versa. At one end of the subsurface conveyor 7, the lifting device 3 expands and contracts the support rod 31 to raise the jig 1 located below the molding dies 51a and 51b to the inside of the molding dies 51a and 51b, and to lower the jig 1 off the molding dies 51a and 51b.

Likewise, at the other end of the subsurface conveyor 7, the lifting device 3 expands and contracts the support rod 31 to raise the jig 1 above the reference plane GL, and to move the jig 1 downward. At the other end of the subsurface conveyor 7, the location where the lifting device 3 is raised is set to one within the range of motion of the feed robot 4a.

As shown in FIG. 6, the feed robot 4a can hold the jig 1a conveyed by the feed conveyor 6a and feed the built-in components 2a to 2c along with the jig 1a to the other end of the subsurface conveyor 7. The feed robot 4a can also hold the empty jig 1b conveyed to the other end of the subsurface conveyor 7 and feeds back it to the feed conveyor 6b.

<Method of Producing Fuel Tank>

Next, a description is given of a method of producing a fuel tank by the production device for a fuel tank according to the second embodiment, with reference to FIGS. 8 to 15.

Figure 8:
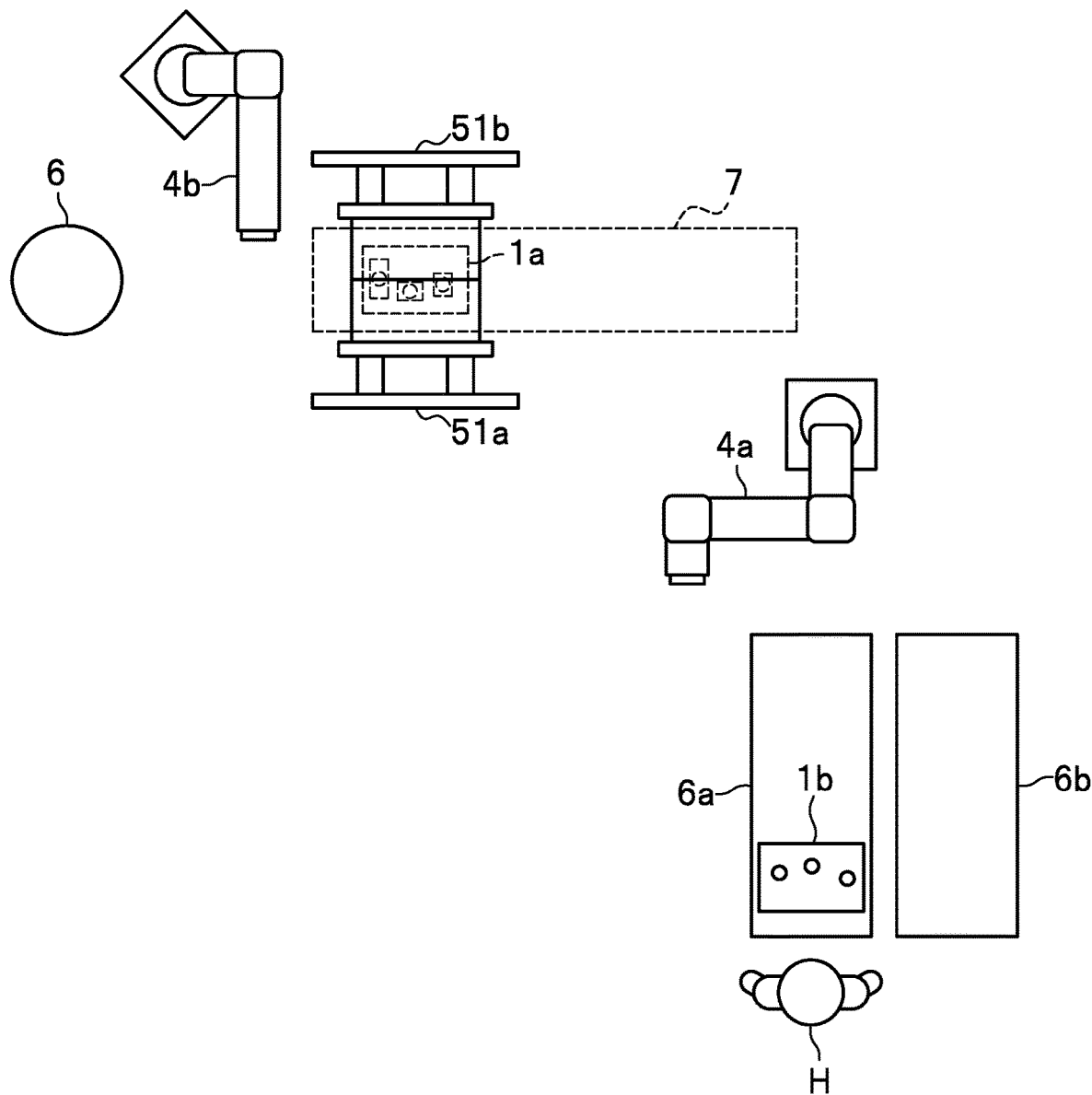
FIG. 8 illustrates a method of producing a fuel tank by the production device according to the second embodiment (1 of 8)

In the beginning, FIG. 8 shows a stage in which the molding dies 51a and 51b are closed and the fuel tank T is being molded. In this situation, the jig 1a having the built-in components 2a to 2c placed thereon is at the waiting position below (directly below) the molding dies 51a and 51b.

Figure 9:
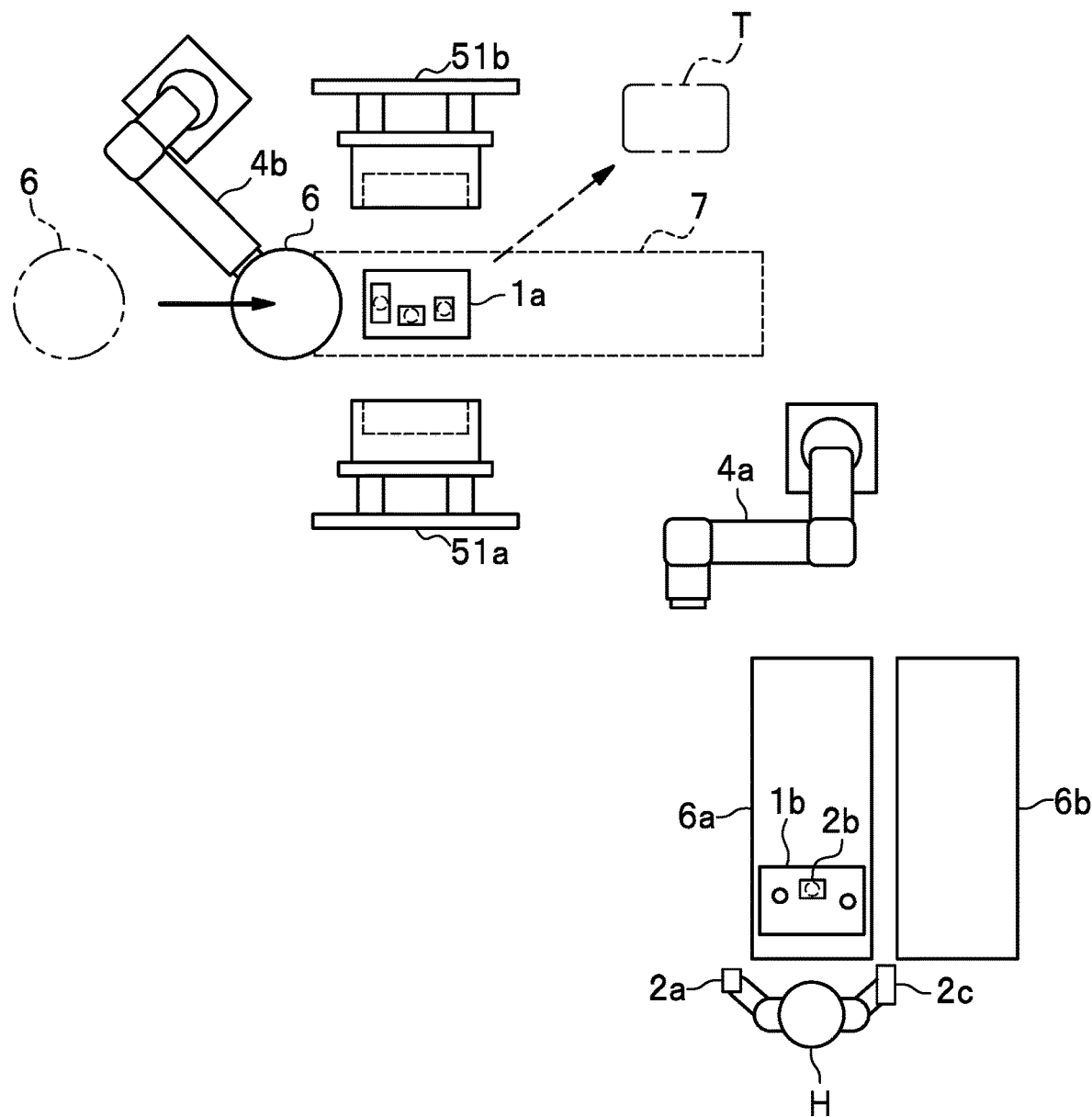
FIG. 9 illustrates the method of producing a fuel tank by the production device according to the second embodiment (2 of 8)

Next, as shown in FIG. 9, the die is opened and the fuel tank T, for which blow molding has already been completed, is taken out by the feed robot (not shown). In addition, the feed robot 4b feeds the new parison 6 to a position between the molding dies 51a and 51b.

Figure 10:
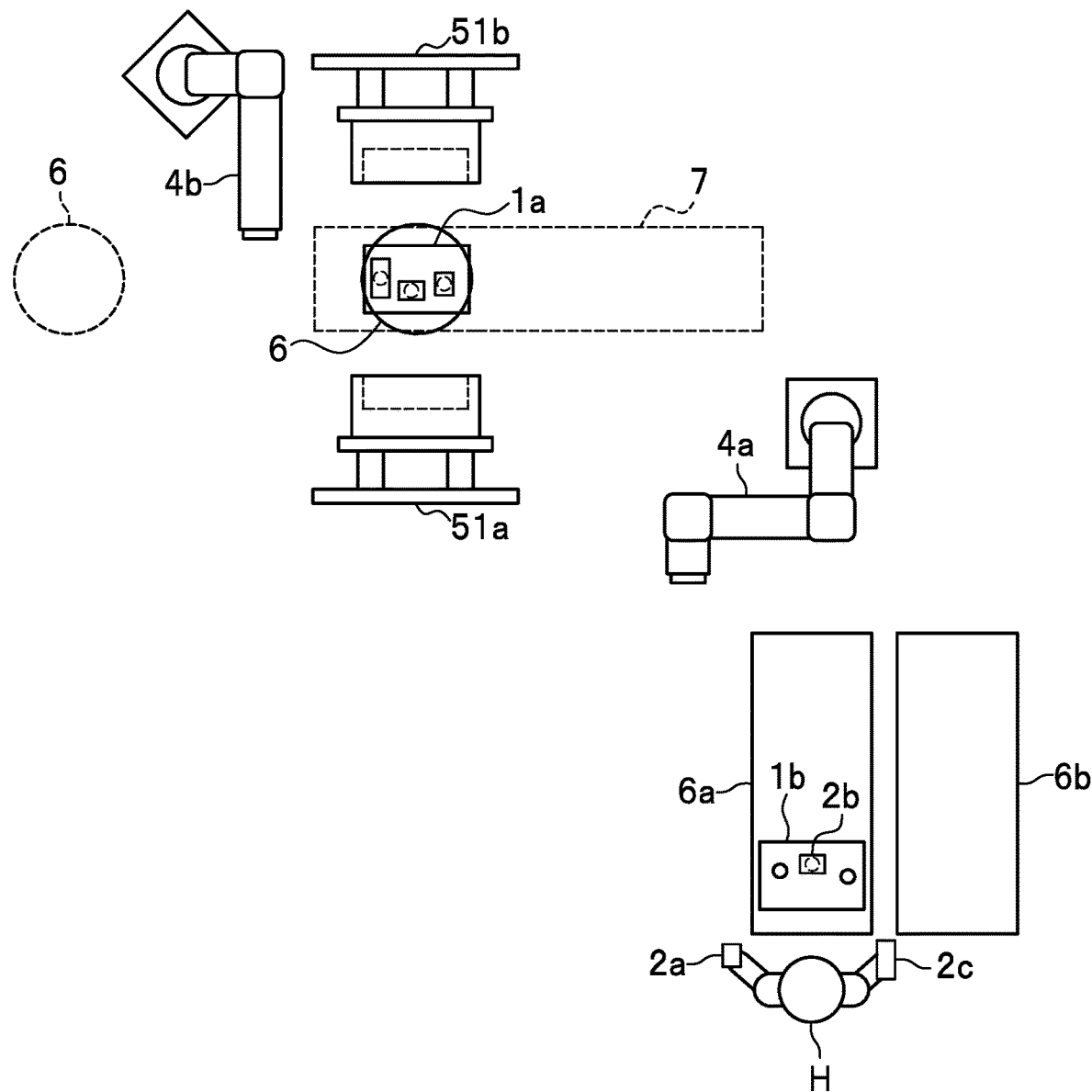
FIG. 10 illustrates the method of producing a fuel tank by the production device according to the second embodiment (3 of 8)

Next, as shown in FIG. 10, the lifting device 3 is raised to position the jig 1a, having the built-in components 2a to 2c placed thereon, inside the parison 6. In addition, the built-in components 2a to 2c are welded to the inside of the parison 6 to have blow molding, as with the first embodiment. After the welding step is completed, the jig 1b is moved downward by the lifting device 3 to a position where the empty jig 1b and the molding dies 51a and 51b do not interfere with each other. In addition, the next parison 6 is prepared behind the molding dies 51a and 51b.

Figure 11:
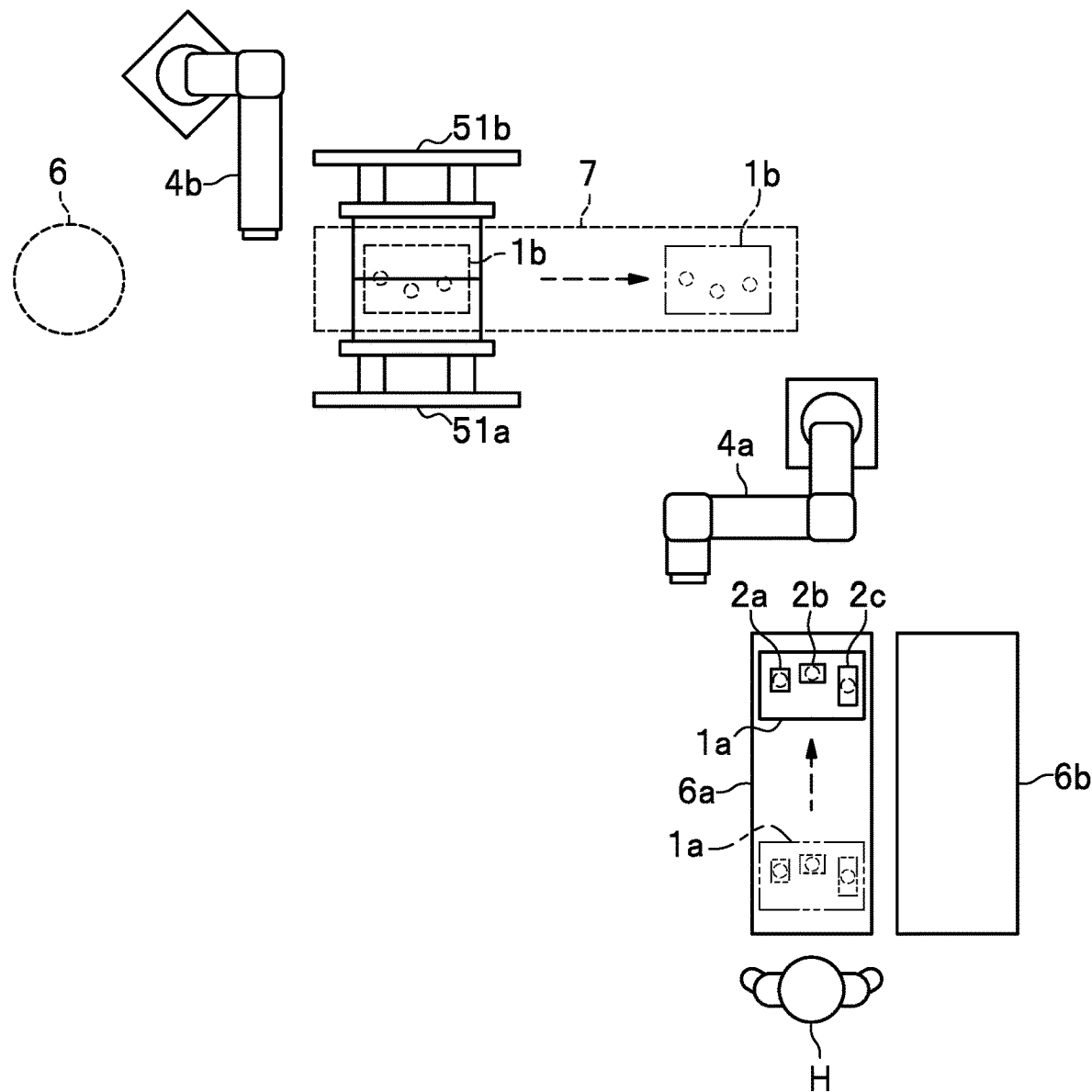
FIG. 11 illustrates the method of producing a fuel tank by the production device according to the second embodiment (4 of 8)
Figure 12:
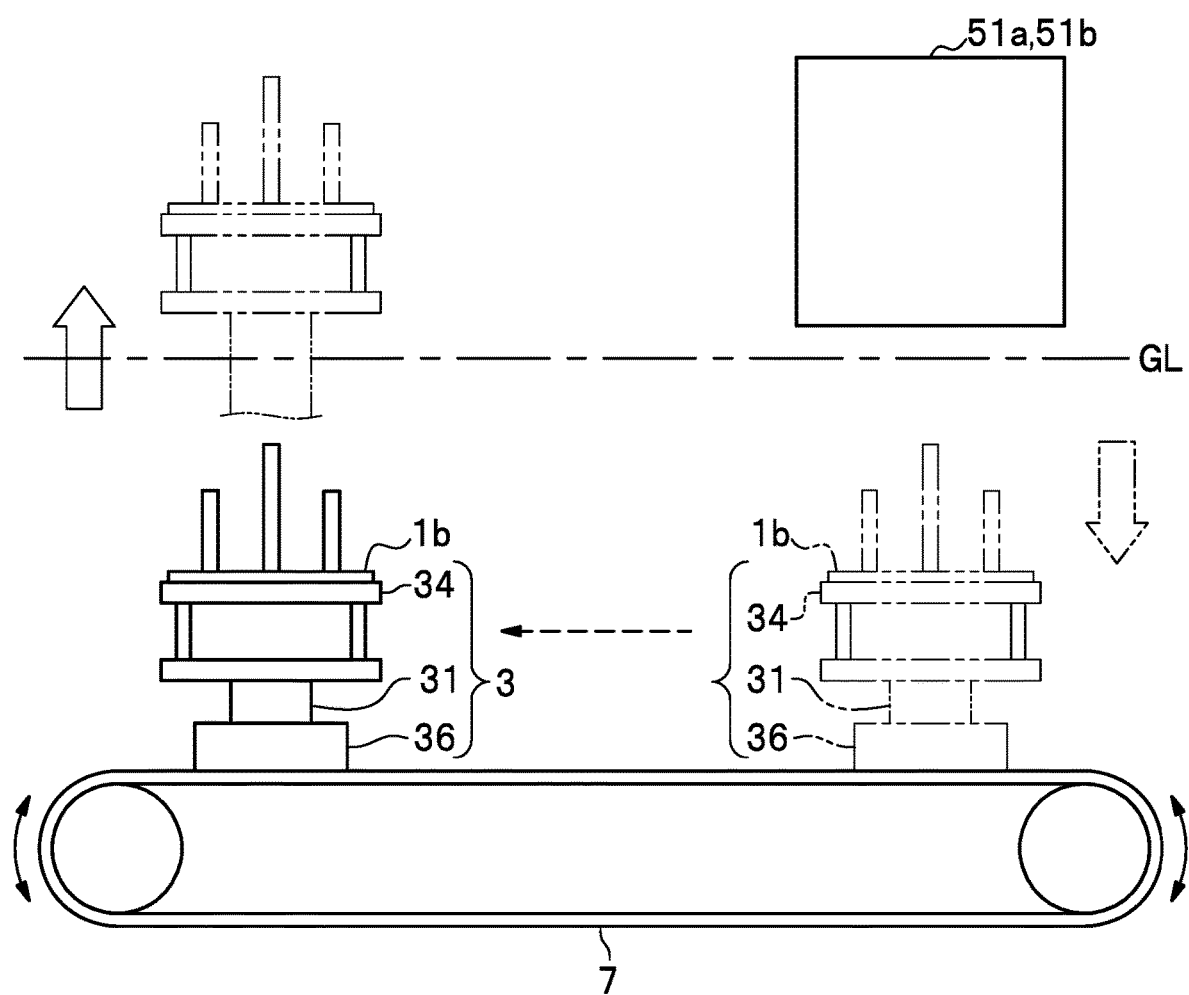
FIG. 12 illustrates the method of producing a fuel tank by the production device according to the second embodiment (5 of 8)

Next, as shown in FIGS. 11 and 12, the jig 1b is conveyed, with the lifting device 3 kept lowered, from one end to the other end of the subsurface conveyor 7. Once the jig 1b reaches the other end of the subsurface conveyor 7, the lifting device 3 is raised to position the jig 1b above the reference plane GL. At this time, the jig 1a having the new built-in components 2a to 2c placed thereon is moved by the feed conveyor 6a to the range of motion of the feed robot 4a.

Figure 13:
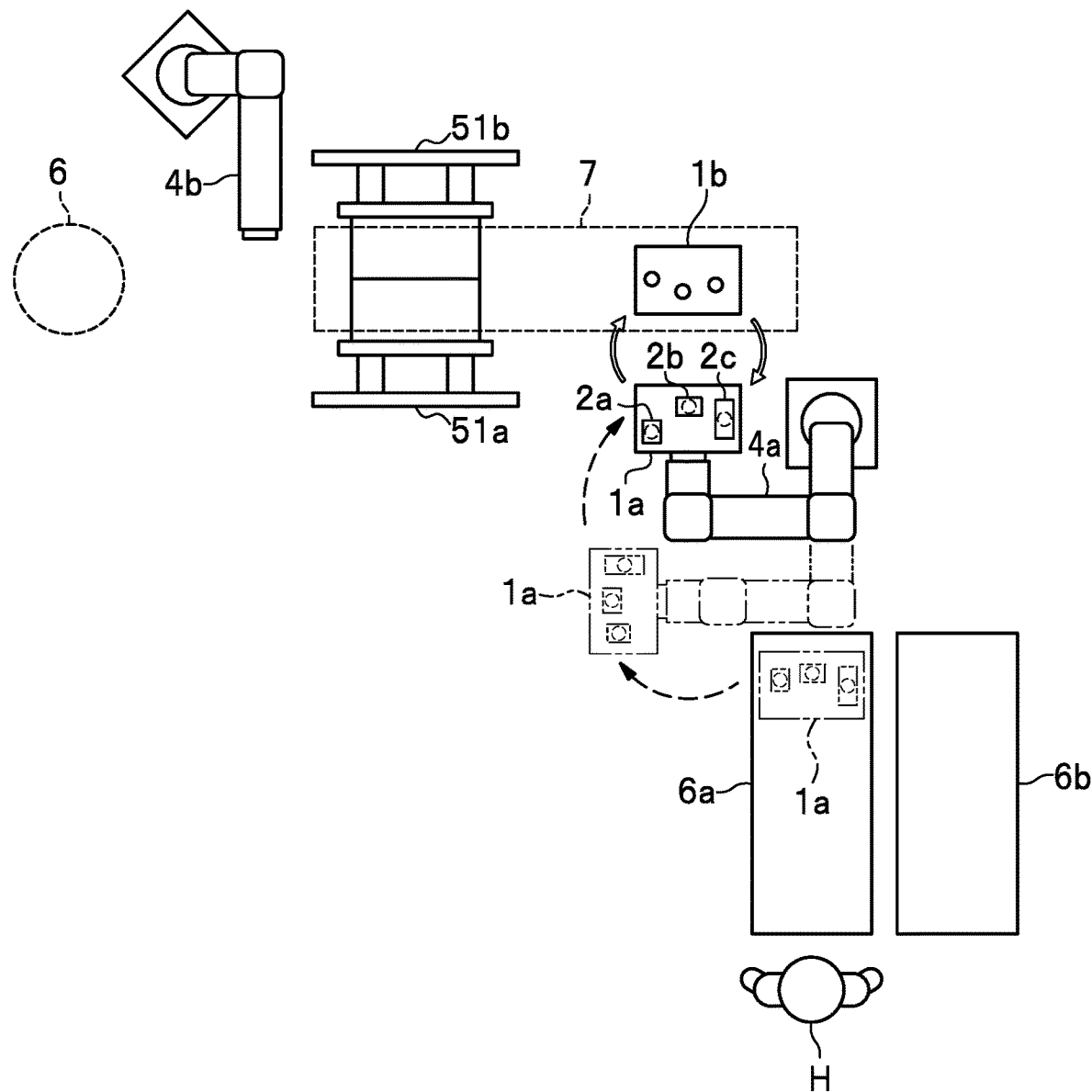
FIG. 13 illustrates the method of producing a fuel tank by the production device according to the second embodiment (6 of 8)

Next, in parallel with the jig 1b being conveyed by the subsurface conveyor 7 to the other end, as shown in FIG. 13, the feed robot 4a holds the jig 1a, having the built-in components 2a to 2c placed thereon, on the feed conveyor 6a, and replaces the empty jig 1b placed on the pedestal 34 with the jig 1a having the built-in components 2a to 2c placed thereon, using the well-known technique as described above.

Figure 14:
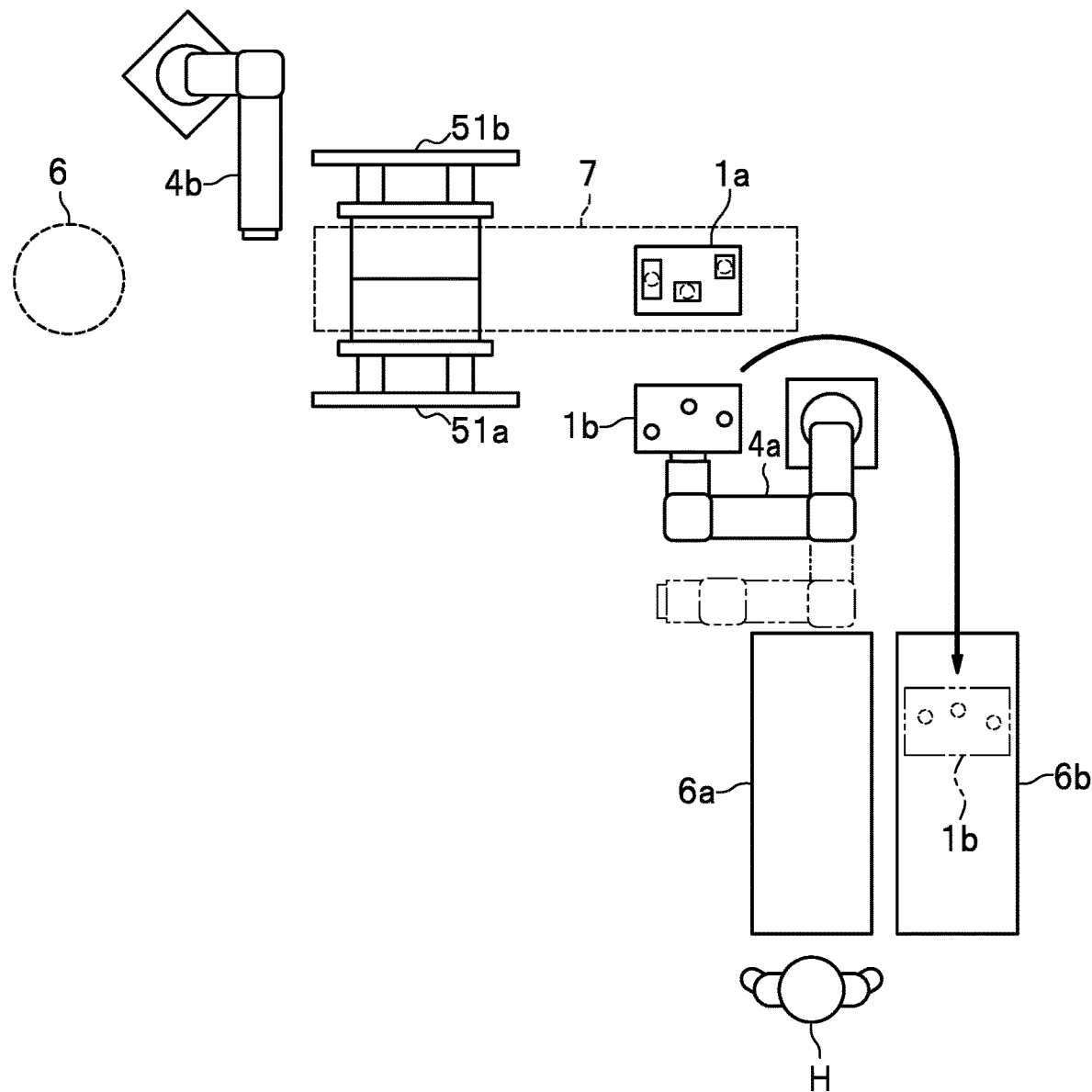
FIG. 14 illustrates the method of producing a fuel tank by the production device according to the second embodiment (7 of 8)

Next, as shown in FIG. 14, the feed robot 4a feeds back the empty jig 1b having no built-in components 2a to 2c placed thereon to the feed conveyor 6b. The worker H places the new built-in components 2a to 2c on the empty jig 1b, and puts the jig 1b on hold on the feed conveyor 6b and also within the range of motion of the feed robot 4a.

Figure 15:
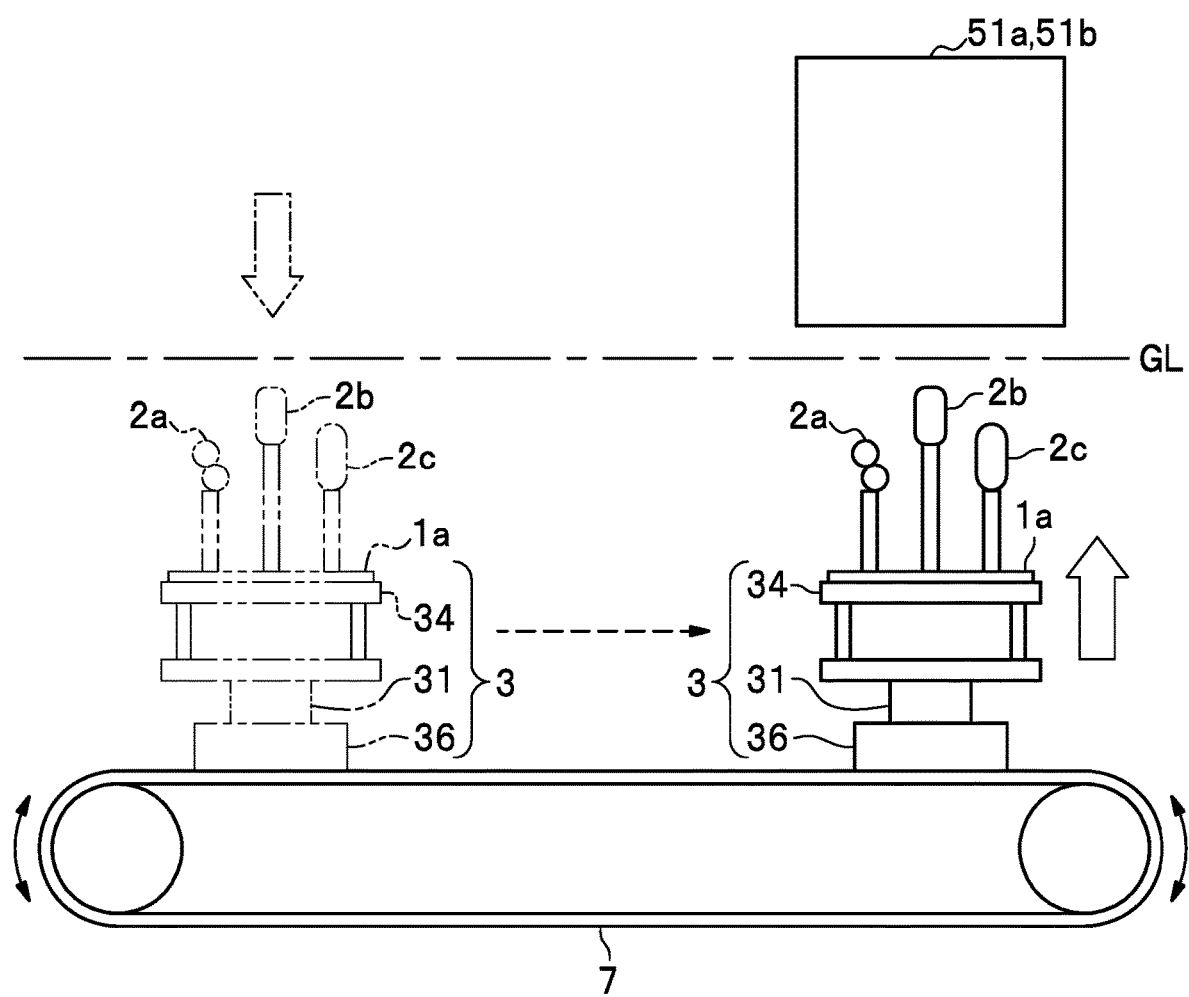
FIG. 15 illustrates the method of producing a fuel tank by the production device according to the second embodiment (8 of 8).

Additionally, in parallel with the feed robot 4a feeding the jig 1b, the lifting device 3 lowers the pedestal 34, and is conveyed by the subsurface conveyor 7 from the other end to one end, with the pedestal 34 kept lowered, as shown in FIG. 15, to have the jig 1a, having the built-in components 2a to 2c placed thereon, put on hold at a position below (directly below) the molding dies 51a and 51b (as in FIG. 8).

When the molding dies 51a and 51b are opened, the fuel tank T is taken out (see FIG. 9), and the lifting device 3 is raised at a predetermined timing to weld (blow molding) the built-in components 2a to 2c, as shown in FIG. 15. The blow molding is executed as with the first embodiment. Repeating the above steps allows for continuously producing the fuel tanks T.

According to the second embodiment, the production cycle can be further shortened as compared with the first embodiment. With the first embodiment, the molding dies 51a and 51b interfere with the feed robot 4a, so that the empty jig 1b is replaced with the placed jig 1a, having the built-in components 2a to 2c placed thereon, only after the molding dies 51a and 51b are opened.

In contrast, the second embodiment includes the subsurface conveyor (feed device) 7 in addition to the feed robot 4a, to allow the empty jig 1b to be moved through the subsurface space and then replaced with the jig 1a having the built-in components 2a to 2c placed thereon, while the molding dies 51a and 51b are closed. Additionally, the jig 1a having the built-in components 2a to 2c placed thereon is put on hold at the position below (directly below) the molding dies 51a and 51b through the subsurface conveyor 7, to allow for immediately placing the jig 1a inside the parison 6 once the molding dies 51a and 51b are opened. This allows the second embodiment to shorten the production cycle.

Modifications

Two or more feed robots 4a may be provided for feeding the jigs 1a and 1b. For example, one feed robot 4a feeding only the jig 1a having the built-in components 2a to 2c placed thereon and another feed robot 4a feeding only the empty jig 1b may be provided and arranged at predetermined positions.

LEGEND FOR REFERENCE NUMERALS

1; 1a; 1b: jig, 2a to 2c: built-in component, 3: lifting device, 4a: feed robot (feed device), 4b: feed robot, 51a; 51b: molding die, 6a; 6b: feed conveyor, and 7: subsurface conveyor (feed device).

The invention claimed is:

1. A production device for production of fuel tanks having two or more built-in components, the production device comprising:
 a first jig having two or more first built-in components placed thereon, when a first fuel tank is molded, so that the two or more first built-in components are built in the first fuel tank;
 a second jig having two or more second built-in components placed thereon when a second fuel tank is molded, to provide for the two or more second built-in components to be built in the second fuel tank;
 a pair of molding dies;
 a lifting device including a support rod, a pedestal, and a slide mechanism, and the lifting device is configured to support:
  the first jig when the first fuel tank is molded, and
  at a subsequent time, the second jig when the second fuel tank is molded; and
 at least one feed device configured to feed the first jig, having the two or more first built-in components placed thereon, to a position below the molding dies, so that the first jig is supported by the lifting device when the first fuel tank is molded;

the at least one feed device is configured such that following completion of molding of the first fuel tank, the at least one feed device performs replacement of (a) the first jig, from which the two or more first built-in components have been removed for molding, with (b) the second jig having the two or more second built-in components, for the second fuel tank, placed thereon; and the at least one feed device performing replacement of the first jig with the second jig includes (a) removal of the first jig from the lifting device; and (b) independently moving the second jig, relative to movement of the first jig, so that the second jig is supported by the lifting device for when the second fuel tank is molded.

2. The production device for a fuel tank according to claim 1, wherein the at least one feed device feeds the first jig, having the built-in components placed thereon, to the position through a subsurface feed path leading to a location below the molding dies.

3. The production device for a fuel tank according to claim 1, wherein the at least one feed device includes a feed robot.

4. The production device for a fuel tank according to claim 1, wherein the at least one feed device includes a conveyor.

* * * * *